`US007800644B2`

United States Patent
Hwang et al.

(10) Patent No.: US 7,800,644 B2
(45) Date of Patent: Sep. 21, 2010

(54) APPARATUS FOR INTEGRATING VIDEO AND POWER TRANSMISSION SIGNALS

(75) Inventors: Shih-Ming Hwang, 16842 Millikan Ave., Irvine, CA (US) 92606;
Chien-Jone Hwang, Irvine, CA (US);
Liang-Lun Hwang, Irvine, CA (US)

(73) Assignee: Shih-Ming Hwang, Irvine, CA (US)

( * ) Notice: Subject to any disclaimer, the term of this patent is extended or adjusted under 35 U.S.C. 154(b) by 1061 days.

(21) Appl. No.: 11/467,547

(22) Filed: Aug. 26, 2006

(65) Prior Publication Data

US 2008/0062320 A1 Mar. 13, 2008

(51) Int. Cl.
*H04N 9/00* (2006.01)
(52) U.S. Cl. .................. 348/143; 348/14.01; 348/14.08
(58) Field of Classification Search .................. 348/143
See application file for complete search history.

(56) References Cited

U.S. PATENT DOCUMENTS

| | | | | |
|---|---|---|---|---|
| 6,603,842 | B2* | 8/2003 | Elberbaum | 348/143 |
| 6,940,957 | B2* | 9/2005 | Elberbaum | 348/143 |
| 2005/0184867 | A1* | 8/2005 | Osann | 348/143 |
| 2006/0171453 | A1* | 8/2006 | Rohlfing et al. | 348/143 |
| 2007/0076094 | A1* | 4/2007 | Dickerson et al. | 348/143 |
| 2007/0140234 | A1* | 6/2007 | Hwang et al. | 370/389 |
| 2007/0182819 | A1* | 8/2007 | Monroe | 348/143 |
| 2007/0291115 | A1* | 12/2007 | Bachelder et al. | 348/143 |
| 2008/0024605 | A1* | 1/2008 | Osann | 348/143 |
| 2009/0115570 | A1* | 5/2009 | Cusack, Jr. | 348/143 |

\* cited by examiner

*Primary Examiner*—Curtis Kuntz
*Assistant Examiner*—Maria El-Zoobi
(74) *Attorney, Agent, or Firm*—Pai Patent & Trademark Law Firm; Chao-Chang David Pai

(57) ABSTRACT

An apparatus for integrating video and power transmission signals that comprises a front pane, a back panel, a power indicator, an unshielded twisted pair (UTP)-based video signal converting circuit, a power supply circuit, a UTP I/O terminal, a BNC coaxial cable-based video output terminal, and a power input terminal, said apparatus connecting to a plurality of video cameras, each having an independent UTP I/O terminal. Such cameras can transmit video and receive power signals through individual UTP cables, said apparatus receiving a first signal and filtering noises of said first signal to output a second signal via a BNC-coaxial-cable-based video output terminal to a digital video server, thereby integrating all monitoring and power transmission signals in said apparatus to effectively lower procurement costs and reduce the amount of space required for installation.

7 Claims, 3 Drawing Sheets

APPARATUS FOR INTEGRATING VIDEO AND POWER TRANSMISSION SIGNALS

BACKGROUND OF THE INVENTION

1. Field of the Invention

This invention relates to an apparatus for integrating video and power transmission signals and more particularly to an apparatus using UTP I/O terminals for receiving video signals from and providing power to video cameras in a security monitoring system.

2. Description of the Prior Art

As the global economy continues to develop and the gross domestic product (GDP) of most countries continues to increase, people become ever more concerned about their wealth and their personal safety, thereby creating a demand for various surveillance and monitoring devices to protect valuable property and to ensure individual safety. The security monitoring market has been growing steadily, especially in the U.S. and Western Europe, where the market is highly developed.

The security monitoring system prior art is based on analog signals using videotapes as the primary storage medium. However, due to the limited storage capacity of videotapes, it is often necessary to replace videotapes manually on a regular basis. Furthermore, videotapes are not viable for long-term storage needs, and tend to require much space for storage. Also, the mediocre image quality of such tapes is also a basic concern, leading to an increase in the use of hard discs as the most common choice for video storage. Nowadays, digital video servers have been widely adopted among financial institutions, hospitals, and other organizations or companies that require enhanced security features. These digital video servers provide added functions such as remote monitoring capabilities and clearer image quality, and they connect to optical disc drives to back the data up. Hence, digital video servers have been regarded as a replacement for analog monitoring pro ducts.

A UTP cable may be used to connect the security monitoring system to the remote digital video server for transmitting power, video, audio, control, and detection signals. However, it usually requires more than two devices to integrate all the input/output signals, which tends to increase the cost, time, and space required for installation.

SUMMARY OF THE INVENTION

In order to overcome the above-mentioned deficiencies, after years of research and development efforts, the inventor has proposed an apparatus for integrating various types of transmission signals used in various monitoring systems, wherein the apparatus comprises a front panel, a back panel, a power indicator, a UTP-based video signal converting circuit, a power supply circuit, UTP I/O terminals, a BNC-coaxial-cable-based video output terminal, and a power input terminal. The apparatus effectively reduces procurement costs and the amount of space required for installation of a security monitoring system.

BRIEF DESCRIPTION OF THE DRAWINGS

The above objects and other merits of the present invention will become more apparent by describing in detail the preferred embodiment of the present invention with reference to the attached drawings in which.

DETAILED DESCRIPTION OF THE PREFERRED EMBODIMENT

Figure 1:
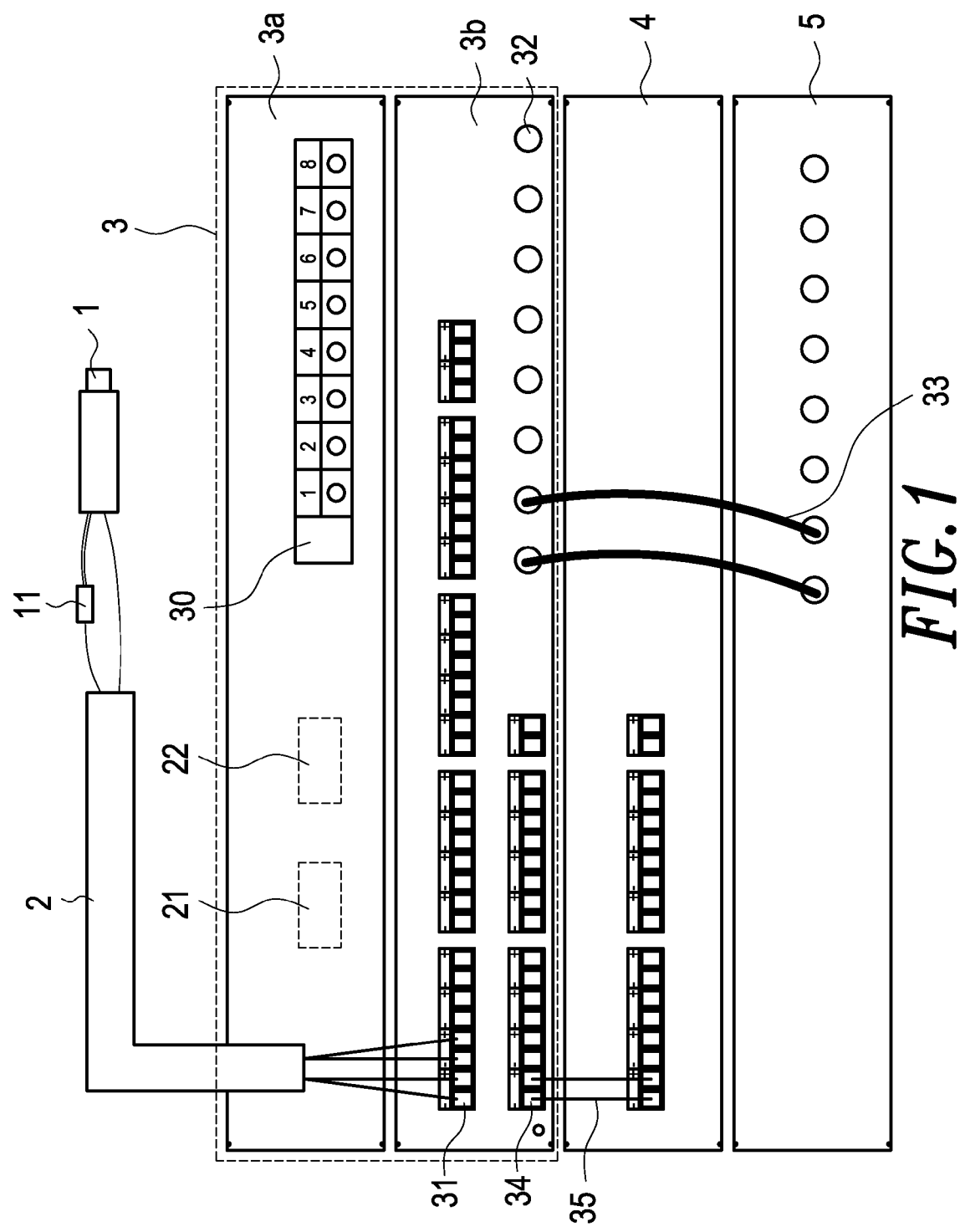
FIG. 1 illustrates a diagram for a preferred embodiment of the present invention.
Figure 2:
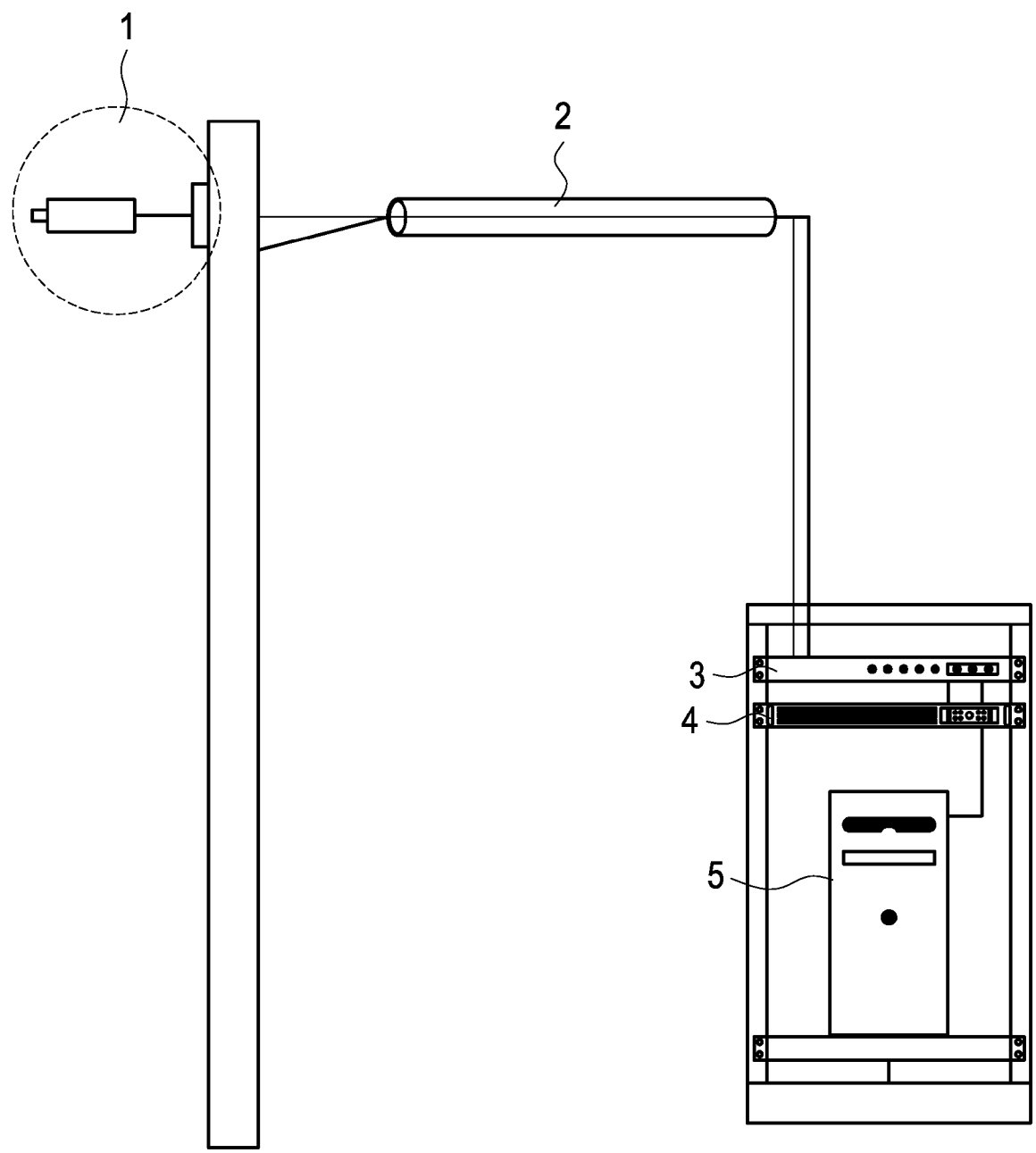
FIG. 2 illustrates a front view of the present invention.
Figure 3:
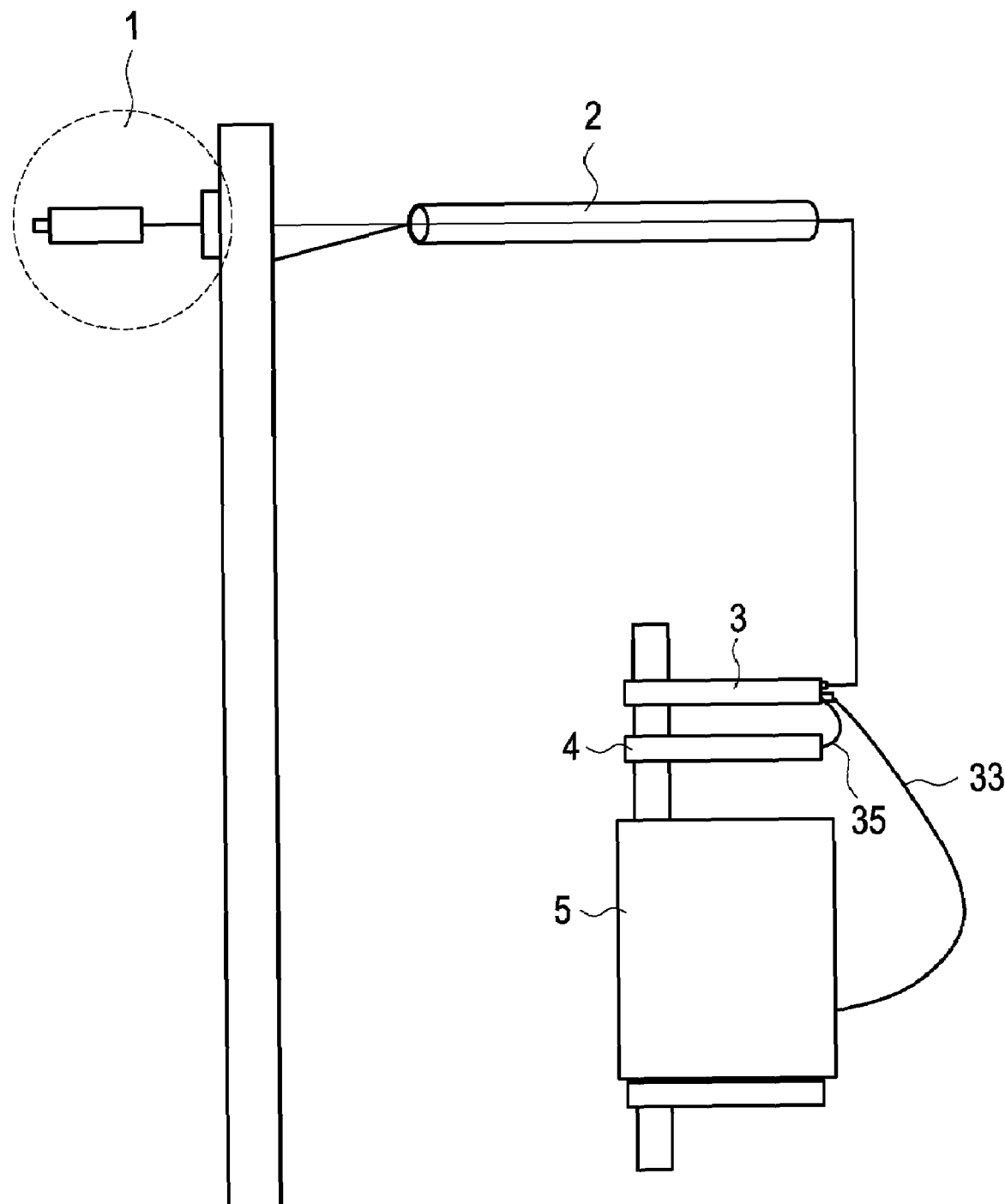
FIG. 3 illustrates a side view of the present invention.

Please refer to FIG. 1~3. The apparatus for integrating video and power transmission signals comprises a front panel (3a), a back panel (3b), a plurality of power indicators (30), a UTP-based video signal converting circuit (21), a power supply circuit (22), a plurality of UTP I/O terminals (31), a plurality of BNC-coaxial-cable-based video output terminals (32), and a plurality of power input terminals (34). In this embodiment, said apparatus (3) connects to one or more cameras (1) and UTP converters (11) via UTP-based cables (2) attached to UTP I/O terminals (31), and also connects to a power supply (4) via a plurality of power cords (35) which couple to said power input terminals (34). This arrangement allows said apparatus (3) to provide power to said cameras (1) through said built-in power supply circuit (22) coupled to said UTP I/O terminals (31) and said UTP-based cables (2).

On the other hand, camera video signals received by said apparatus (3) are filtered by said UTP-based video signal converting circuit (21) and then sent through said BNC-coaxial-cable-based video output terminals (32) and BNC coaxial cables (33) to a digital video server (5), thereby integrating all monitoring capabilities in one apparatus to effectively lower procurement cost and reduce the space required for installation. Furthermore, all the cables are connected through said back panel (3b) for the user's and installer's convenience, while only the power indicators are implemented on said front panel (3a) for easy operation and maintenance.

Many changes and modifications in the above described embodiment of this invention can, of course, be carried out without departing from the scope of the present invention. Accordingly, to promote progress in science and the useful arts, this invention is disclosed and is intended to be limited only by the scope of the appended claims.

What is claimed is:

1. An apparatus for integrating video and power transmission signals comprising:

a front panel comprising a power indicator;

a back panel comprising an unshielded twisted pair (UTP) I/O terminal, a BNC-coaxial-cable-based video output terminal, and a power input terminal;

a UTP-based video signal converting circuit; and a power supply circuit;

wherein said UTP I/O terminal receives video signals from said video cameras through UTP-based cables;

said UTP-based video signal converting circuit integrates said video signals received by said UTP I/O terminal, filters noises of said video signals, and then outputs filtered camera video signals to said BNC-coaxial-cable-based video output terminal;

said BNC-coaxial-cable-based video output terminal transmits said filtered camera video signals via a BNC coaxial cable to a digital video server;

said power input terminal, when connected to a power supply, provides power through said power supply circuit to said UTP I/O terminal for supplying power to said video cameras through said UTP-based cables; and said power indicator is connected to said power supply circuit for indicating whether power is provided to one or more video cameras.

2. The apparatus of claim 1, wherein said front panel comprises a plurality of power indicators.

3. The apparatus of claim 1, wherein said back panel comprises a plurality of said UTP I/O terminals.

4. The apparatus of claim 1, wherein said UTP I/O terminal of said back panel connects to a color camera via said UTP-based cables.

5. The apparatus of claim 1, wherein said UTP I/O terminal of said back panel connects to a black and white camera via said UTP-based cables.

6. The apparatus of claim 1, wherein said back panel comprises a plurality of said BNC-coaxial-cable-based video output terminals.

7. The apparatus of claim 1, wherein said back panel comprises a plurality of said power input terminals.

* * * * *